E. JAMES.
POWER TRANSMISSION MECHANISM.
APPLICATION FILED DEC. 29, 1909.
990,814.
Patented Apr. 25, 1911.
4 SHEETS—SHEET 1.
Fig. 1.
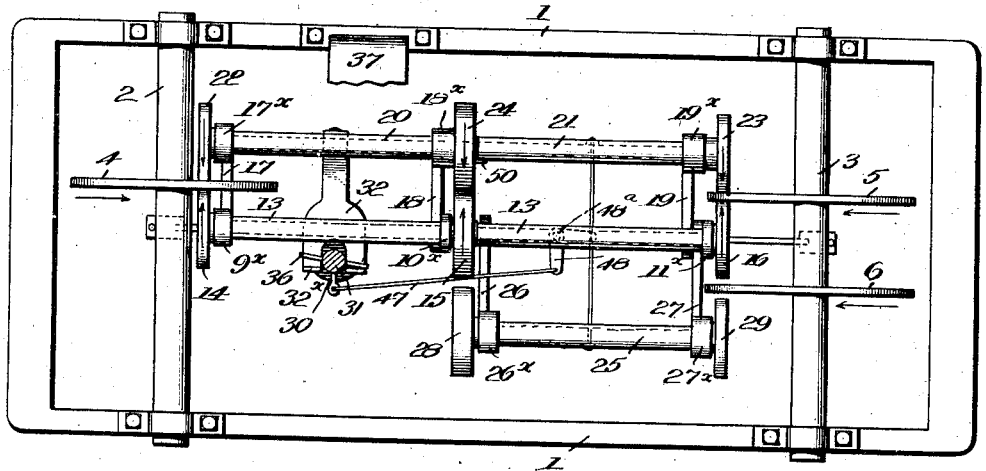
Fig. 2.
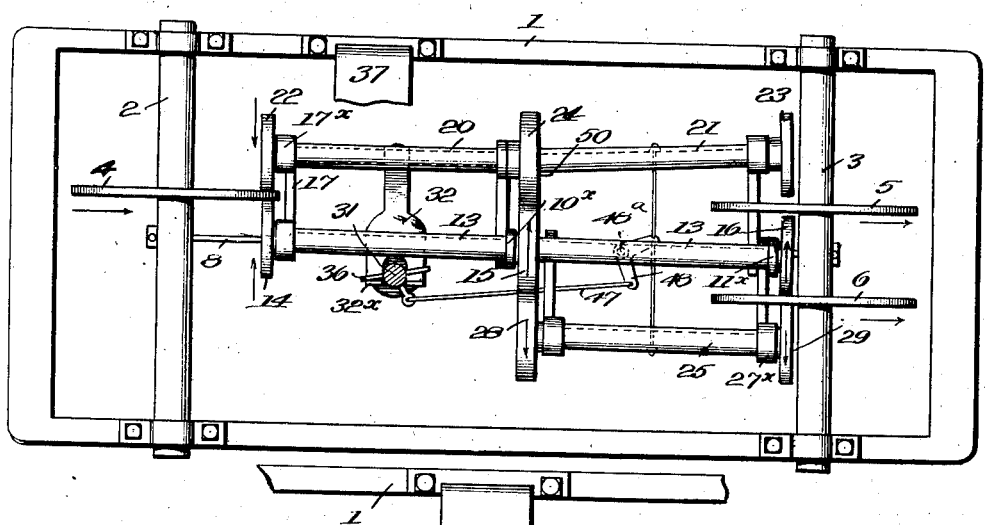
Fig. 3.
WITNESSES:
F. E. Barry
L. H. Stanley
INVENTOR
EDGAR JAMES
BY Munn & Co.
ATTORNEYS E. JAMES.
POWER TRANSMISSION MECHANISM.
APPLICATION FILED DEC. 29, 1909.
990,814.
Patented Apr. 25, 1911.
4 SHEETS—SHEET 2.
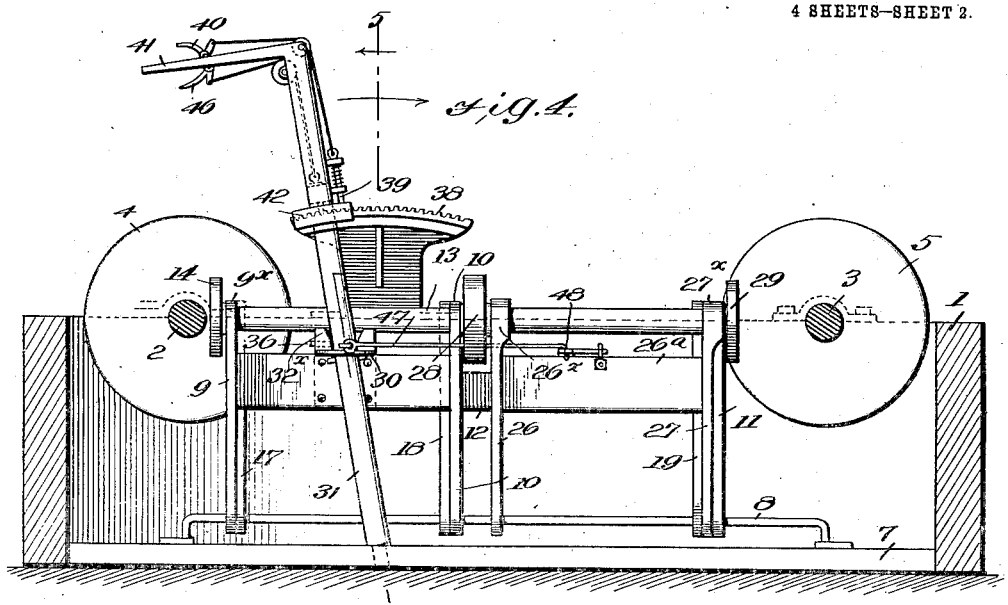
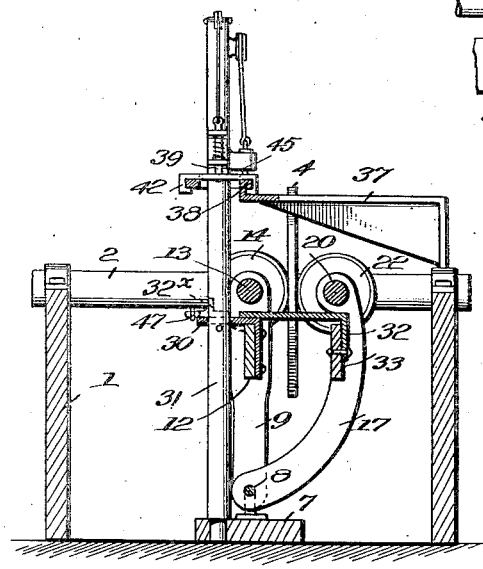
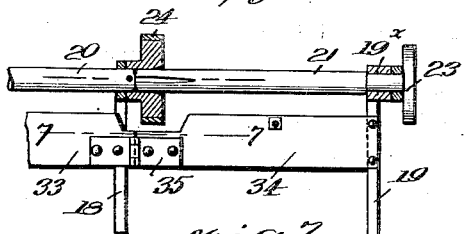
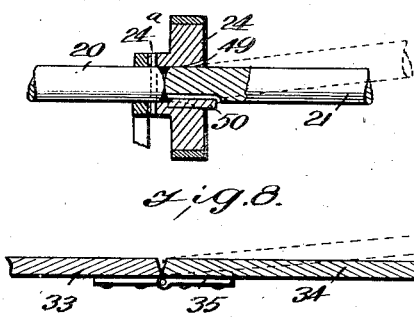
WITNESSES:
F. C. Barry
L. H. Stanley
INVENTOR
EDGAR JAMES
BY Munn & Co.
ATTORNEYS

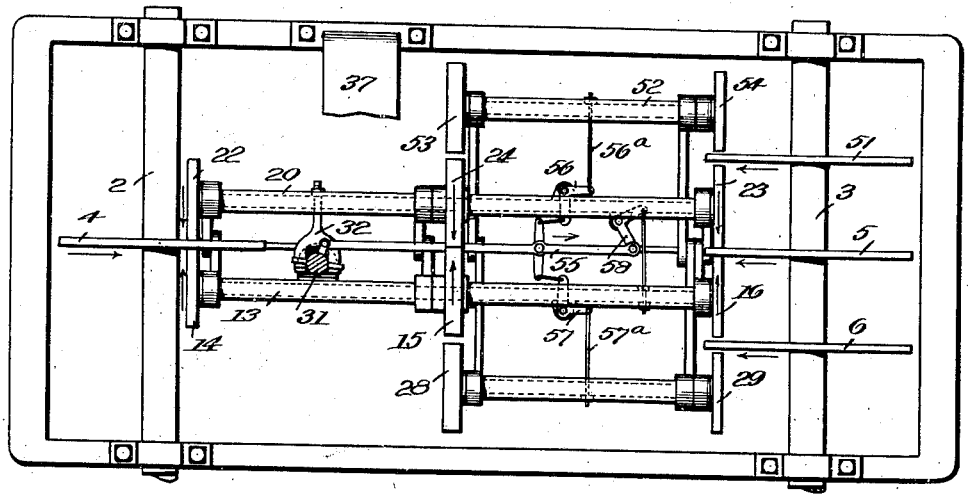
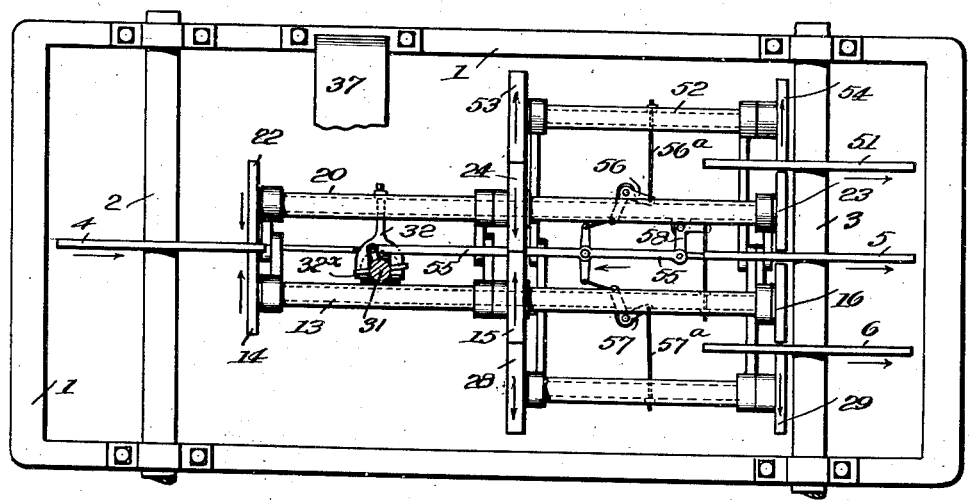
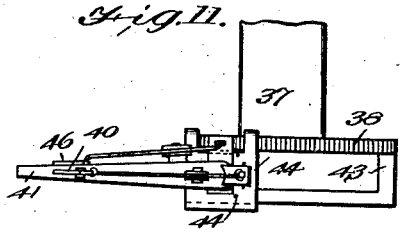

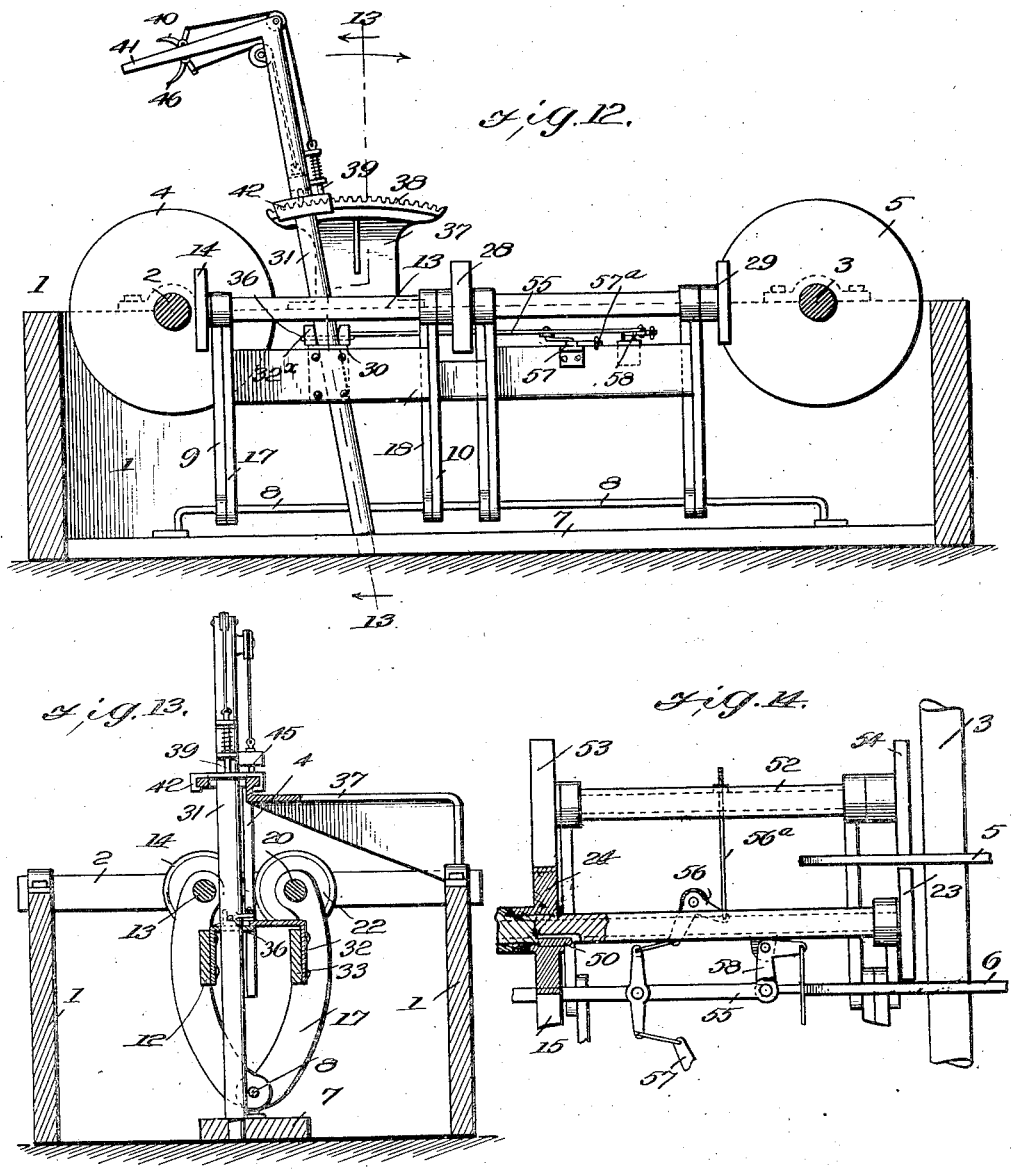

UNITED STATES PATENT OFFICE.

EDGAR JAMES, OF LINCOLNTON, NORTH CAROLINA, ASSIGNOR OF ONE-HALF TO R. E. COSTNER, OF LINCOLNTON, NORTH CAROLINA.

POWER-TRANSMISSION MECHANISM.

990,814.        Specification of Letters Patent.     Patented Apr. 25, 1911.

Application filed December 29, 1909. Serial No. 535,385.

To all whom it may concern:

Be it known that I, EDGAR JAMES, a citizen of the United States, and a resident of Lincolnton, in the county of Lincoln and State of North Carolina, have made certain new and useful Improvements in Power-Transmission Mechanism, of which the following is a specification.

My invention relates to improvements in devices for transmitting power and it consists in the combinations, constructions and arrangements herein described and claimed.

An object of my invention is to provide means by which motion may be transmitted from a shaft or other moving part to another shaft, with means for varying the speed or causing the reversal of the movement of the second shaft at will.

A further object of my invention is to provide novel means for the operation of a series of friction wheels so as to cause the wheels to bear on or to be moved away from the friction wheels.

A further object of my invention is to provide a slidable frame for carrying the friction wheels, the movement of this frame causing the shifting of the wheels relative to the friction disks and thus resulting in a variation in the speed of the device.

Other objects and advantages will appear in the following specification and the novel features of the device will be particularly pointed out in the appended claims.

My invention is illustrated in the accompanying drawings in which—

Figure 1 is a plan view showing one embodiment of my improved power transmission. Fig. 2 is a similar view showing the mechanism in a shifted position. Fig. 3 is a plan view of the operating lever and the locking mechanism therefor. Fig. 4 is a longitudinal section through the device. Fig. 5 is a transverse section along the line 5—5 of Fig. 4, looking in the direction of the arrows. Fig. 6 is a detail view showing the pivoted shafts and frame. Fig. 7 is a detail view at right angles to Fig. 6 showing the hinged shaft. Fig. 8 is a section at right angles to Fig. 6 showing the hinged frame. Fig. 9 is a plan view showing a modified form of transmission. Fig. 10 is a plan view similar to Fig. 9 showing the mechanism in a shifted position. Fig. 11 is a plan view of the operating lever and the locking mechanism. Fig. 12 is a longitudinal section through the modified device. Fig. 13 is a transverse section along the line 13—13 of Fig. 12. Fig. 14 is a detail view showing the lever connections in a modified form.

In carrying out my invention I provide a main frame 1 bearing at one end a power shaft 2 and at the other end a driving shaft 3, the shaft 2 is provided with a friction wheel 4, while the shaft 3 is provided with the friction wheels 5 and 6. A base strip 7 extends longitudinally of the device as shown in Figs. 4 and 5 and to this strip is secured a rod 8. Mounted to slide on the rod 8 are the three uprights 9, 10 and 11. These uprights are secured together by means of a central brace 12 while their upper ends $9^x$, $10^x$ and $11^x$ constitute bearings for a shaft 13. This shaft is provided with friction wheels 14, 15 and 16.

Referring now to Figs. 4 and 5 it will be seen that there is a second series of curved uprights slidably mounted at their lower ends upon the rod 8. These curved uprights are shown at 17, 18 and 19. The upper ends of the curved supports 17, 18 and 19 are provided with bearings $17^x$, $18^x$ and $19^x$ respectively. In the bearings $17^x$ and $18^x$ is mounted a short shaft 20, while between the bearings $18^x$ and $19^x$ is mounted a shaft 21 which is connected with the shaft 20 in the manner hereinafter described. The shaft 20 bears on one end a friction wheel 22 while the shaft 21 bears a friction wheel 23. At the joining of the shafts 20 and 21 is a friction wheel 24. On the opposite side of the shaft 13 from the shaft 21 is a shaft 25 which is mounted in the bearings $26^x$ and $27^x$ of the curved supports 26 and 27 which are similar to the supports 18 and 19 and which are also mounted on the rod 8 at their lower ends. The shaft 25 bears the friction wheels 28 and 29. The uprights 26 and 27 are connected by means of a brace $26^a$. Secured to the longitudinal brace 12 is a bracket 30 through an opening in which the shaft 31 of the operating lever extends. The lower end of this shaft is pivotally mounted in an opening in the base portion 7. A yoke 32 is secured to a longitudinal brace 33 which connects the support 17 and the support 18, and the brace 34 is hinged at 35 to the brace 33 and is secured at the other end to the support 19. The shaft 31 of the operating lever is provided with a pin 36 arranged to engage the upturned ends 32ˣ of the yoke 32 to limit its movement.

It will be seen from Figs. 3 and 5 that a bracket 37 is secured to the frame 1 upon which the devices for locking the lever in its shifted positions are held. The means for locking the lever in its forward and rearward positions is best shown in Fig. 4. It consists of a segment 38 provided with teeth into which a spring actuated locking member 39 is arranged to engage. This member may be controlled by the lever 40 on the handle 41 so as to retain the lever in its different positions. The means for locking the lever in its rotated position is shown in Fig. 3. It consists of a plate 42 which is slidable on the frame 43 and which is provided with a series of holes 44 into which the locking member 45, (see Fig. 5) may project. This locking member is controlled by the lever 46 on the handle 41.

The operating lever 31 is connected by means of a link 47 to a bell crank lever 48 secured to the central brace 12. The opposite end of this lever is connected to the respective braces 34 and 26ᵃ on either side.

The connections between the shafts 20 and 21 is best shown in Figs. 6 and 7. In these figures it will be seen that the wheel 24 is connected to the shaft 20 by means of a pin 24ᵃ. The wheel 24 is recessed at 49 to provide for play of the shaft 21 which is secured to the wheel 24 by means of a key and slot connection 50. It will be seen that the slot is slightly larger than the key so as to permit the shaft 21 to be inclined but arranged so as to drive the shaft 21.

From the foregoing description of the various parts of the device the operation thereof may be readily understood. Let us assume that the power shaft 2 and the disk 4 are turning in the direction indicated by the arrow in Fig. 1. If now, the handle 41 of the operating lever be turned clockwise or as in Fig. 4 toward the plane of the paper and at the same time set toward the rear as shown in Fig. 4, the apparatus will assume the position shown in Fig. 1. It will be noted that in this position the wheels 14 and 22 are in contact with the disk 4 and that they are close to the shaft 2, and slow motion in opposite directions will be imparted to the shafts 13 and 20, the latter imparting motion to the shaft 21. The rotation of the operating lever has caused the bell-crank lever 48 to move so as to bring the friction wheel 23 into engagement with one side of the disk 5. The bell-crank lever is pivoted at 48ᵃ which is the fulcrum. When the wheel 23 bears on the disk a further rotation of the shaft will cause the crowding of the shaft 13 toward the shaft 21 thereby bringing the wheel 14 into engagement with the disk 4 and the wheel 16 into engagement with the disk 5. This will cause the rotation of the disk 5 in the direction indicated by the arrow. The disk 6 being on the same shaft will, of course, rotate in the same direction. The operating lever may be kept in its turned position by means of the pin 45 which enters the holes 44. The speed can be increased or decreased by moving the handle in the direction of the curved arrow shown in Fig. 4. When the operating shaft is rotated in the opposite direction the parts will take the position shown in Fig. 2. In this position the wheel 23 on the shaft 21 is thrown out of engagement with the disk 5, the loose joint at the wheel 24 permitting the shaft 21 to incline. The wheel 29 is pulled inwardly into contact with the wheel 6. When this wheel bears on the disk 6 the reaction at the fulcrum 48ᵃ will force the shaft 13 upwardly and the wheel 16 into engagement with the wheel 6. At the same time the wheel 28 is forced into engagement with the wheel 15 thereby crowding the wheel 14 against the wheel 4. The rotation of the shafts 13 and 20 causes the wheel 15 to move in the direction indicated by the arrow, the wheel 28 moves in the opposite direction, and therefore the wheels 29 and 16 will move in the direction indicated by the arrows for these parts. This will result in the rotation of the shaft 3 and the disks 5 and 6 in the opposite direction to that indicated by the arrows in Fig. 1. Thus it will be seen that the rotation of the operating rod will cause a forward or reverse movement of the shaft 3, with the driving shaft 2 rotating continuously in one direction. Since the frame bearing the shafts may be caused to slide along the rod 8 the friction wheels may engage their respective disks near the center of rotation of the latter or farther away from them thereby changing the speed from a maximum to a minimum or vice versa.

In Figs. 9 to 14 inclusive I have shown a modified form. This consists principally in the addition of a third disk 51 and a shaft 52 bearing wheels 53 and 54. When the operating lever 31 is turned clockwise it will push the link 55 forwardly in the direction indicated by the arrow, Fig. 9. This will cause the bell cranks 56 and 57 to move the rods 56ᵃ and 57ᵃ outwardly thereby disengaging wheels 54 and 29 from their respective disks 51 and 6, and at the same time the bell-crank 58 will cause the wheels 23 and 16 to engage the disk 5 and to turn the latter in the direction indicated by the arrow. In Fig. 10 the retraction of the rod 55 in the direction indicated by the arrow will cause the bell cranks 56 and 57 to pull inwardly on the rods 56ᵃ and 57ᵃ so that the wheels 54 and 29 will be caused to engage the respective disks 51 and 6. At the same time the wheels 28 and 53 will contact with the respective wheels 15 and 24. The disks 51 and 6 will be driven in the opposite direction from that shown in Fig. 9 and the shaft 3 will therefore have its direction of rotation reversed.

It will thus be seen that I provide a device in which the motion of one shaft is transmitted by means of movable friction devices and that within limits any number of speeds may be had, either forward or reverse direction.

I claim:—

1. A power transmission device comprising a drive shaft, a driven shaft, friction disks on each of said shafts, a series of slidably mounted friction wheels for transmitting motion from one shaft to the other, means including a lever for shifting the entire series of wheels to effect a change of speed, and other means adapted to be actuated by said lever for shifting certain of said wheels into and out of engagement with said disks for causing the reversal of the driven shaft.

2. A power transmission device comprising a drive shaft, a driven shaft, friction disks on each of said shafts, a series of slidably mounted friction wheels for transmitting motion from one shaft to the other, means including a lever for shifting the entire series of wheels to effect a change of speed, and other means adapted to be actuated by said lever for shifting certain of said wheels into and out of engagement with said disks for causing the reversal of the driven shaft, means for locking the shifting means to maintain a constant speed and means for locking the shifting means to maintain rotation in a given direction.

3. In a transmission device a pair of parallel shafts, friction disks on said parallel shafts, a series of slidable friction wheels disposed between said shafts and adapted to be moved toward either shaft, a lever pivoted at one end arranged to shift said wheels by movement about said pivot, said lever being adapted to be rotated on its axis and connections between said lever and certain of said friction wheels for bringing them into and out of engagement with said friction disks to cause a reversal of the transmitting motion.

4. In a transmission device, a frame, a base therefor, a pair of parallel shafts mounted transversely of said frame, friction disks carried by said shafts, a series of shafts slidably mounted on the said base disposed between said transverse shafts, friction wheels carried by said longitudinal shafts, a lever pivotally mounted on said base for moving said shafts in the direction of their length, said lever being adapted to rotate about its own axis, lever and link connections for moving certain of said longitudinal shafts in a lateral direction to bring the friction wheels into or out of engagement with the disks, and means for maintaining the shafts in both of their adjusted positions.

5. In a power transmission device, a pair of parallel shafts, friction disks carried thereby, a series of slidably mounted shafts disposed between said parallel shafts and at right angles to them, means for moving said series of shafts toward or away from said parallel shafts, means for moving said longitudinal shafts toward and away from each other, one of said shafts having a universal joint, friction wheels mounted on said series of movable shafts and adapted to engage said friction disks and a common operating lever for moving all of said series of shafts toward and away from said parallel shafts.

EDGAR JAMES.

Witnesses:
R. E. COSTNER,
J. A. ANTHONY.